United States Patent [19]

Kaneko et al.

[11] Patent Number: 5,194,959
[45] Date of Patent: Mar. 16, 1993

[54] IMAGE FORMING APPARATUS FOR FORMING IMAGE CORRESPONDING TO SUBJECT, BY DIVIDING OPTICAL IMAGE CORRESPONDING TO THE SUBJECT INTO PLURAL ADJACENT OPTICAL IMAGE PARTS

[75] Inventors: Yutaka Kaneko, Yokohama; Masanori Saitoh, Komae; Iwao Hamaguchi, Yamato; Kazutake Uehira, Yokosuka; Kazumi Komiya, Kanagawa, all of Japan

[73] Assignee: Ricoh Company, Ltd. and Nippon Telegraph and Telephone Corporation, Tokyo, Japan

[21] Appl. No.: 628,860

[22] Filed: Dec. 18, 1990

[30] Foreign Application Priority Data

Dec. 21, 1989 [JP] Japan .................................. 1-331971
Sep. 4, 1990 [JP] Japan .................................. 2-235134
Sep. 4, 1990 [JP] Japan .................................. 2-235135

[51] Int. Cl.⁵ ........................ H04N 5/225; G02B 13/16
[52] U.S. Cl. ..................................... 358/225; 358/213.28
[58] Field of Search .............. 358/225, 226, 213.11, 358/213.28, 87

[56] References Cited

U.S. PATENT DOCUMENTS

| 3,291,905 | 12/1966 | Smith | 358/141 |
|---|---|---|---|
| 3,932,702 | 1/1976 | Shelley et al. | 358/225 |
| 4,044,384 | 8/1977 | Inokuchi | 358/213.13 |
| 4,272,684 | 6/1981 | Seachman | 358/225 |
| 4,323,925 | 4/1982 | Abell et al. | 358/213.28 |
| 4,589,030 | 5/1986 | Kley | 358/225 |
| 4,663,656 | 5/1987 | Elabd et al. | 358/209 |
| 4,774,592 | 9/1988 | Suzuki et al. | 358/213.28 |
| 4,823,202 | 4/1989 | Morizuni | 358/213.28 |
| 4,890,314 | 12/1989 | Judd et al. | 358/87 |
| 4,974,073 | 11/1990 | Inova | 358/87 |
| 5,016,109 | 5/1991 | Gaylord | 358/225 |
| 5,063,441 | 11/1991 | Lipton et al. | 358/225 |

FOREIGN PATENT DOCUMENTS

| 56-40546 | 9/1981 | Japan . | |
| 59-045787 | 3/1984 | Japan | 358/141 |
| 59-126378 | 7/1984 | Japan | 358/225 |
| 60-213178 | 10/1985 | Japan . | |

Primary Examiner—Herbert Goldstein
Assistant Examiner—Wendy R. Greening
Attorney, Agent, or Firm—Mason, Fenwick & Lawrence

[57] ABSTRACT

An image forming apparatus for forming an image corresponding to a subject is provided, which image forming apparatus includes a taking lens for making an optical image corresponding to the subject, and a dividing portion for dividing the optical image transmitted via said taking lens into several adjacent optical image parts. The image forming apparatus further includes several solid-state image sensors corresponding to the number of the optical image parts, each of said solid-state image sensors receiving a corresponding optical image part from among the several optical image parts from the dividing portion and outputting an image signal corresponding to the optical image part, the optical image parts received by said solid-state image sensors being adjacent to each other. Finally, the image forming apparatus includes an image forming portion, coupled to said solid-state image sensors, for forming an image part corresponding to the respective optical image part based on the image signal transmitted from one of said solid-state image sensors, and for composing each image part to form the image corresponding to the subject by arranging the image parts to be adjacent to each other like the optical image parts.

17 Claims, 12 Drawing Sheets

FIG.19

| 100 | 89 | 81 | 74 | 68 | 63 | 58 | 56 | 53 | 51 | 50 |
|---|---|---|---|---|---|---|---|---|---|---|
| 89 | 78 | 71 | 64 | 60 | 56 | 52 | 49 | 47 | 45 | 45 |
| 81 | 71 | 64 | 58 | 54 | 50 | 47 | 45 | 42 | 41 | 40 |
| 74 | 64 | 58 | 53 | 49 | 46 | 43 | 41 | 39 | 37 | 36 |
| 68 | 60 | 54 | 49 | 45 | 42 | 40 | 37 | 36 | 34 | 33 |
| 63 | 56 | 50 | 46 | 42 | 40 | 37 | 35 | 33 | 32 | 31 |
| 58 | 52 | 47 | 43 | 40 | 37 | 35 | 32 | 30 | 30 | 29 |
| 56 | 49 | 45 | 41 | 37 | 35 | 32 | 30 | 29 | 28 | 27 |
| 53 | 47 | 42 | 39 | 36 | 33 | 30 | 29 | 28 | 27 | 26 |
| 51 | 45 | 41 | 37 | 34 | 32 | 30 | 28 | 27 | 26 | 26 |
| 50 | 45 | 40 | 36 | 33 | 31 | 29 | 27 | 26 | 26 | 25 |

IMAGE FORMING APPARATUS FOR FORMING IMAGE CORRESPONDING TO SUBJECT, BY DIVIDING OPTICAL IMAGE CORRESPONDING TO THE SUBJECT INTO PLURAL ADJACENT OPTICAL IMAGE PARTS

BACKGROUND OF THE INVENTION

The present invention relates generally to image forming apparatuses, and more particularly to an image forming apparatus for forming an image corresponding to an subject. The image forming apparatus achieves a high resolution applicable to a high definition television.

Lately, the Japanese Broadcasting Corporation has been taking a leading role in developing a high definition television (called HDTV for short). The HDTV is also called a high resolution television, which requires more than one million picture elements (called pixels for short), about five times as many as in conventional televisions, and a frequency band width higher than 30 MHz. However, it is difficult to develop a solid-state image sensor having more than one million pixels and a clock frequency higher than 30 MHz. Accordingly, Japanese Laid-Open Patent Application No. 60-213178 has proposed an image forming apparatus having a plurality of solid-state image sensors. According to the image forming apparatus, an optical image is divided into a plurality of optical images corresponding to the number of solid-state image sensors so that each of the optical images is received by a corresponding solid-state image sensor. Then each of the optical images is piled by means of shifting the pixels of each solid-state image sensor a predetermined pitch apart according to the pixel shifting method disclosed in Japanese Patent Publication No. 56-40546. But the image forming apparatus according to the reference No. 60-213178 has the following disadvantages:

1. The proposed image forming apparatus must pile the pixels of each solid-state image sensor so that they are shifted a predetermined pitch apart which is difficult to accomplish. For example, the solid-state image sensors must be shifted several um apart from one another to a precision 1/10, which value tends to be negatively influenced by thermal expansion thereof;

2. The substantial resolution of the proposed image forming apparatus is not as improved as described in the specification thereof because each of the pixels are partially piled, as mentioned above.

SUMMARY OF THE INVENTION

Accordingly, it is a general object of the present invention to provide a novel and useful image forming apparatus in which the above disadvantages are eliminated.

Another object of the present invention is to provide an image forming apparatus with a substantially high resolution.

Still another object of the present invention is to provide an image forming apparatus with high image quality.

Another more specific object of the present invention is to provide an image forming apparatus for forming an image corresponding to a subject, which image forming apparatus includes a taking lens for making an optical image corresponding to the subject, and a dividing means for dividing the optical image transmitted via said taking lens into a plurality of adjacent optical image parts. The image forming apparatus further includes a plurality of solid-state image sensors corresponding to the number of the optical image parts, each of said solid-state image sensors receiving a corresponding optical image part from among the plurality of optical image parts from said dividing means and outputting an image signal corresponding to the optical image part, the optical image parts received by said solid-state image sensors being adjacent to each other. Finally, the image forming apparatus includes image forming means, coupled to said solid-state image sensors, for forming an image part corresponding to the respective optical image part based on the image signal transmitted from one of said solid-state image sensors, and for composing each image part to form the image corresponding to the subject by arranging the image parts to be adjacent to each other like the optical image parts.

According to the present invention, the image is formed by arranging the image parts to be adjacent with each other like the optical image parts, instead of by piling and shifting them. Therefore, pixels are seldom partially piled so that substantially high resolution can be easily obtained.

Other objects and further features of the present invention will become apparent from the following detailed description when read in conjunction with the accompanying drawings.

BRIEF DESCRIPTION OF THE DRAWINGS

FIG. 19 shows a quantity-of-light distribution adjusting filter located between the prismatic mirror and the solid-state image sensor.

DESCRIPTION OF THE PREFERRED EMBODIMENTS

A description will be given of an image forming apparatus of the first embodiment according to the present invention with reference to FIGS. 1 through 7.

Figure 2:
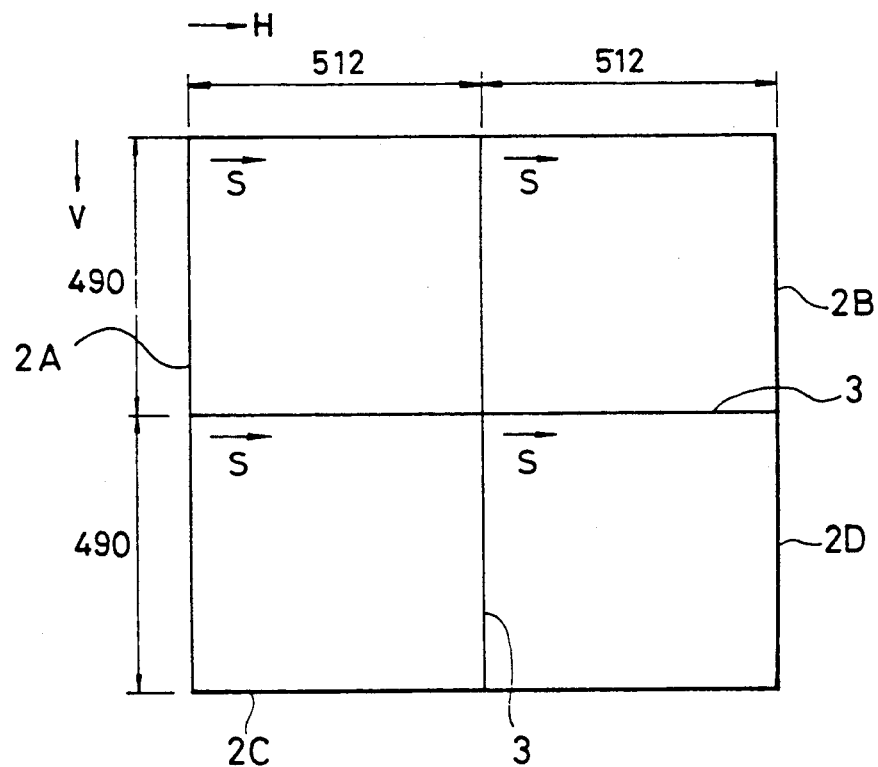
FIG. 2 shows an optical systematic configuration of solid-state image sensors of a first embodiment according to the present invention.

As shown in FIG. 2, each of the solid-state image sensors 2A to 2D, a rectangular shape, has 512 pixels in a horizontal direction and 490 pixels in a vertical direction. Arrows S indicate a scanning direction over each of the solid-state image sensors 2A to 2D. FIG. 2 shows scannable parts of the solid-state image sensors 2A to 2D. An optical image to be received by the solid-state image sensors 2A to 2D is divided into four adjacent optical image parts. Because the number of the pixels of the solid-state image sensors 2A to 2D is four times as many as that of one solid-state image sensor, the resolution of the present invention where four solid-state image sensors are used for a predetermined subject is improved four times as higher as that of conventional image processing system where one solid-state image sensor is used for the same subject. Both a solid-state image sensor according to the EIA method and a one-tip color sensor can be used for the present invention.

Figure 3:
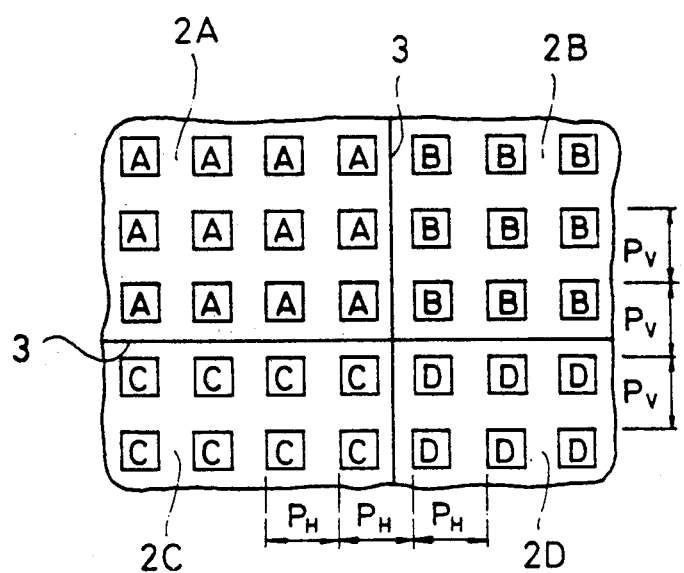
FIG. 3 is a view magnifying a part of FIG. 2.

FIG. 3 shows a pixel configuration magnifying the solid-state image sensors 2A to 2D in the vicinity of the conjunction parts 3. Pixels corresponding to each of the solid-state image sensors are arranged in a group. On the contrary, in the reference No. 60-213178, four kinds of pixels corresponding to each of the solid-state image sensors are mixed because of the piling of the solid-state image sensors. In addition, adjacent pixels according to the present invention are approximately spaced apart by a pitch $P_H$ in the horizontal direction and a pitch $P_V$ in the vertical direction. Particularly in the vicinity of the conjunction parts 3, the pixels may not be precisely spaced apart by such pitches for the purpose of the substantially high resolution as long as the pixels are not partially piled with each other. On the other hand, in the reference No. 60-213178, it is necessary to space apart all the pixels not to be partially piled with each other, which is difficult to accomplish.

Figure 1:
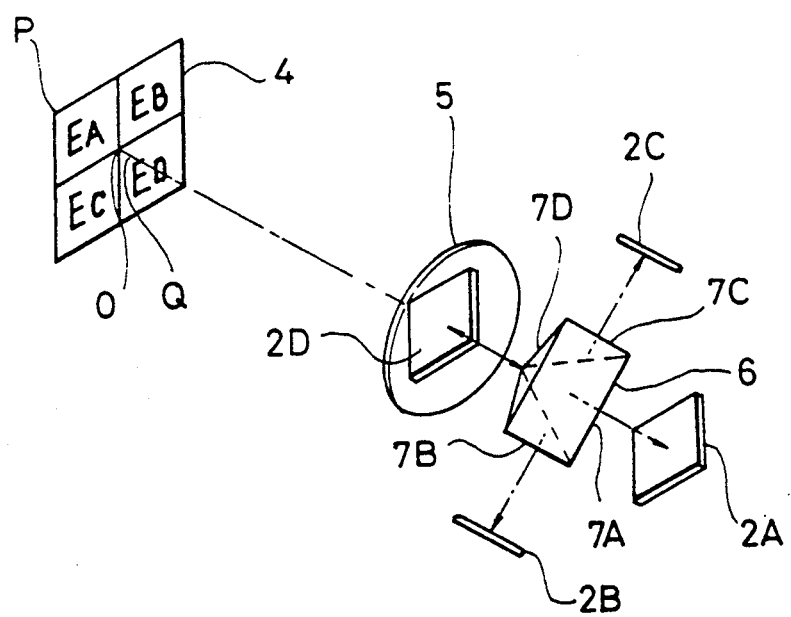
FIG. 1 shows an optical systematic configuration of an image forming apparatus of a first embodiment according to the present invention.

FIG. 1 shows an optical systematic configuration of the image forming apparatus including such four solid-state image sensors 2A to 2D. The image forming apparatus comprises the solid-state image sensors 2A to 2D, a taking lens lens 5, and a prismatic mirror 6. Firstly, an optical image corresponding to a subject 4 is made by the taking lens 5. The prismatic mirror 6 has a quadrangular pyramid shape whose top is aligned with the optical axis so as to arrange inclined angles of reflecting surfaces 7A to 7D thereof at a 45° in relation to the optical axis, respectively. In addition, the prismatic mirror 6 pivots around the optical axis by a 45° in relation to the subject 4. The optical image is divided into four optical image parts on the reflecting surfaces 7A to 7D. Each of the solid-state image sensors 2A to 2D is located at a position where each optical image part is formed. Since the inclined angles of the reflecting surfaces 7A to 7D are made at a 45° against the optical axis, each of reflected optical axes crosses the optical axis at a 90° so that the receiving surfaces of the solid-state image sensors 2A to 2D are parallel to the optical axis, which is easy to locate the solid-state image sensors 2A to 2D around the prismatic mirror 6. Moreover, since each optical image part has a rectangular shape, the solid-state image sensors can easily receive the optical image part, the quartered optical image.

Figure 4:
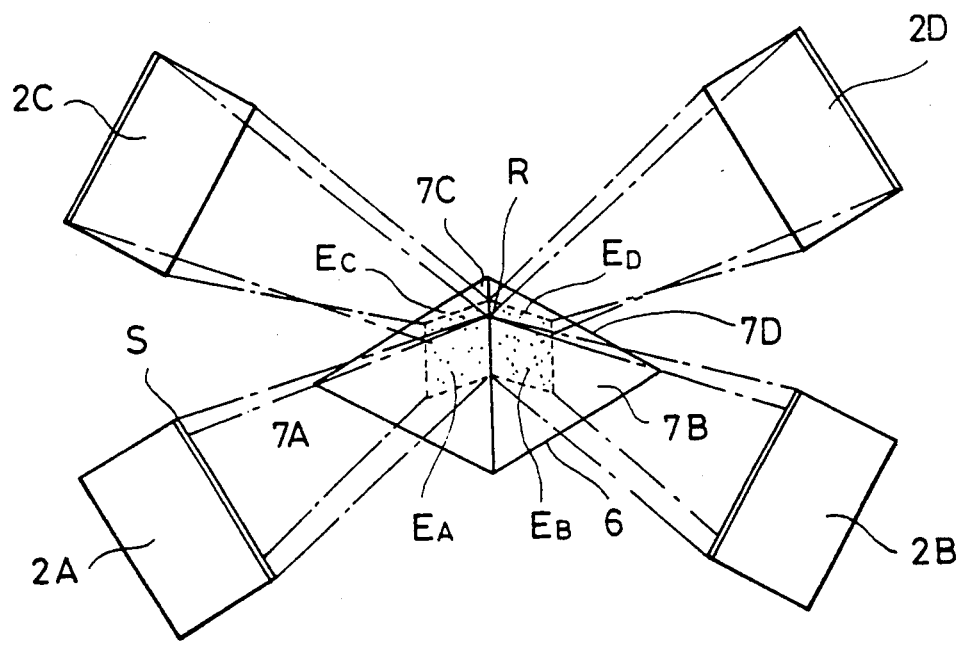
FIG. 4 is a perspective view explaining the reflection at a prismatic mirror.

As shown in FIG. 4, the optical image is quartered to the image parts $E_A$ to $E_D$. Each of the reflecting surfaces 7A to 7D of the prismatic mirror 6 approximately reflects the corresponding optical image part from among the optical image parts $E_A$ to $E_D$. Hereupon, the solid-state image sensor 2A shown in FIG. 1 is located at a position where it can receive the optical image part $E_A$. In the same way, each of the solid-state image sensors 2B to 2D is located at a position where it can receive the corresponding one of the image parts $E_B$ to $E_D$, respectively.

A description will now be given of the reflection on the reflecting surface 7A of the prismatic mirror 6 with reference to FIG. 5. A point O indicates a center of the subject 4, a point P indicates a edge of the optical image part $E_A$, and a point Q indicates an arbitrary point in the optical image part $E_D$ diagonally adjacent to the image part $E_A$. A part of an optical image part from the point Q is reflected at the reflecting surface 7A so that a corresponding image is formed at a point Q'' on the solid-state image sensor 2A. Namely, many parts of the optical image parts $E_A$ to $E_D$ are mixed on the reflecting surface 7A so that other parts of the optical image parts besides the optical image part $E_A$ are reflected thereon. Accordingly, an edge point S of the solid-state image sensor 2A may be located at a point O'' which corresponds to the point O reflected at the top R of the prismatic mirror 6. The solid-state sensors 2B to 2D are located likewise.

The image forming apparatus according to the present invention also has an analog signal processor and an image composition circuit, which are not shown. Since each of the solid-state image sensors 2A to 2D has a scanning function, image information is outputted from each of the solid-state image sensors 2A to 2D after scanning. The image information is fed to the analog signal processor, and then fed to the image composition circuit so as to be composed.

Figure 6:
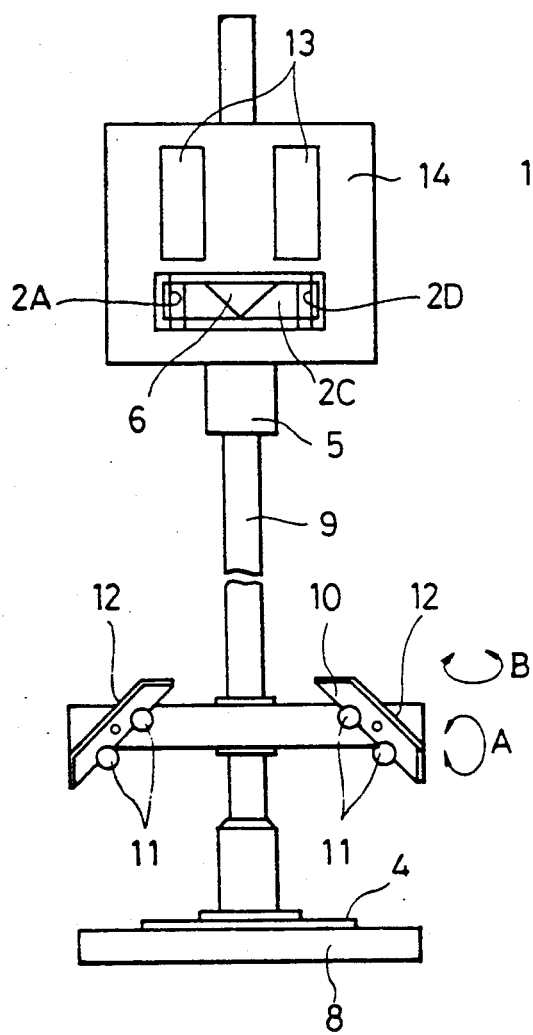
FIG. 6 is a front view of the image forming apparatus according to the present invention.
Figure 7:
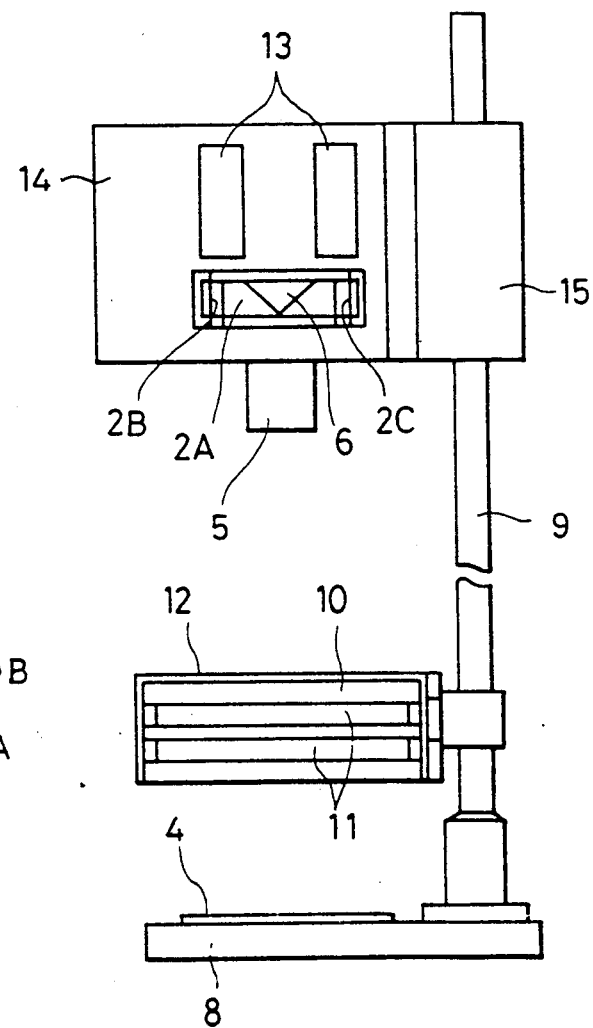
FIG. 7 is a side view corresponding to FIG. 6.

FIGS. 6 and 7 show assembling drawings of the image forming apparatus using such solid-state image sensors. The subject 4 is to be placed on a manuscript table 8, and is illuminated by a fluorescent light 11 of an illumination apparatus 10 attached to a prop 9 via a reflecting plate 12. The prop 9 projects from the edge of the manuscript table 8. The illumination apparatus 10 can be moved along the prop 9. The illumination apparatus 10 is attached to the reflecting plate 12. The reflecting plate 12 is pivotable in directions A and B so as to adjust the luminous intensity on the manuscript table 8. The camera 14 comprising the taking lens 5, the quadrangular pyramid prismatic lens 6, and an analog signal processor 13 is movably supported along the prop 9. The magnification of the camera 14 can also be adjusted.

Figure 8:
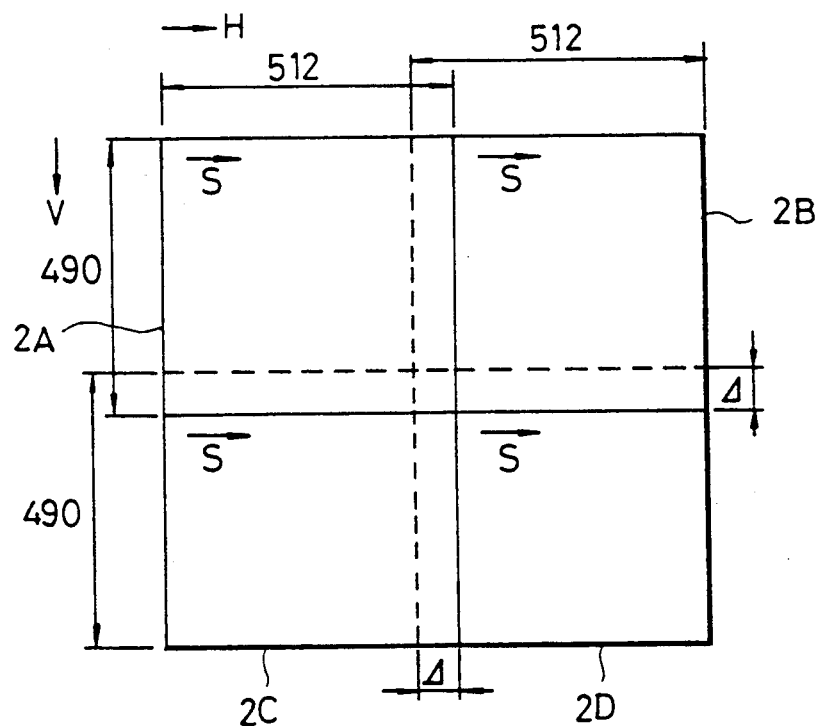
FIG. 8 shows an optical systematic configuration of a solid-state image sensors of a second embodiment according to the present invention.

Next, a description will be given of a second embodiment according to the present invention with reference to FIG. 8. Those elements which are the same as corresponding elements in FIGS. 1 to 7 are designated by the same reference numerals, and a description thereof will be omitted. According to the embodiment, four solid-state image sensors 2A to 2D are partially piled at the conjunction parts 3. Δ indicates the piled parts. When the optical image parts are composed, one of the image parts corresponding to the piled parts Δ is abandoned in order to prevent from overlapping of the image. The piled part Δ may be completely extracted from either of the adjacent solid-state image sensors or each of the adjacent solid-state image sensors may bear a half of each of the piles, as indicated by a one-dot line.

Thus, the solid-state image sensors 2A to 2D are partially piled at the conjunction parts 3 so that the each of the solid-state image sensors may not be precisely adjacent to each other.

Figure 9:
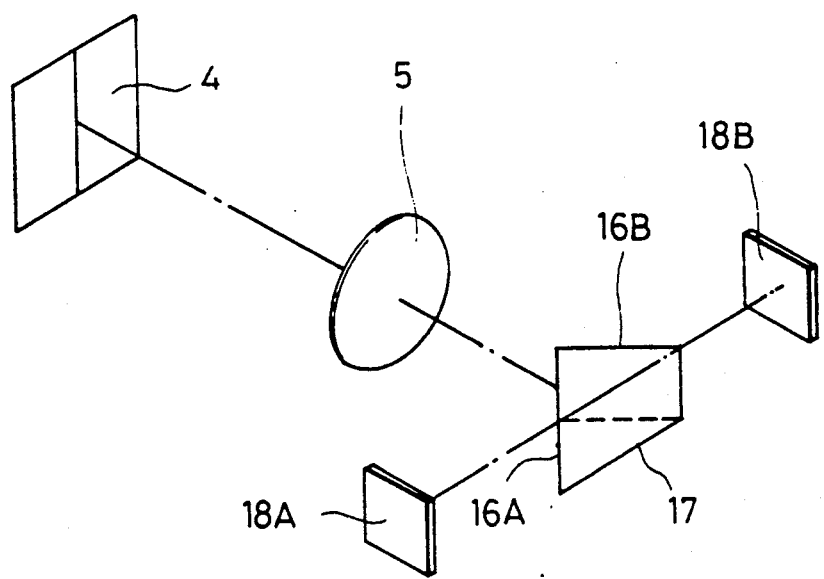
FIG. 9 is an optical systematic configuration of an image forming apparatus of a third embodiment according to the present invention.

A description will be given of the image forming apparatus of the third embodiment according to the present invention with reference to FIG. 9. In this embodiment, a trigonal prismatic mirror 17 with reflecting surfaces 16A and 16B is used so that the optical image is divided into two optical image parts. Accordingly, each of two solid-state image sensors 18A and 18B is at a position where the optical image part is formed. In FIG. 9, a ridgeline in the vicinity of a vertical angle 90° of the trigonal prismatic mirror 17 crosses the optical axis of the taking lens 5. And the reflecting surfaces 16A and 16B are inclined 45° in relation to the optical axis. Each of the receiving surfaces 18A and 18B is located parallel to the optical axis and the ridgeline, respectively.

Figure 5:
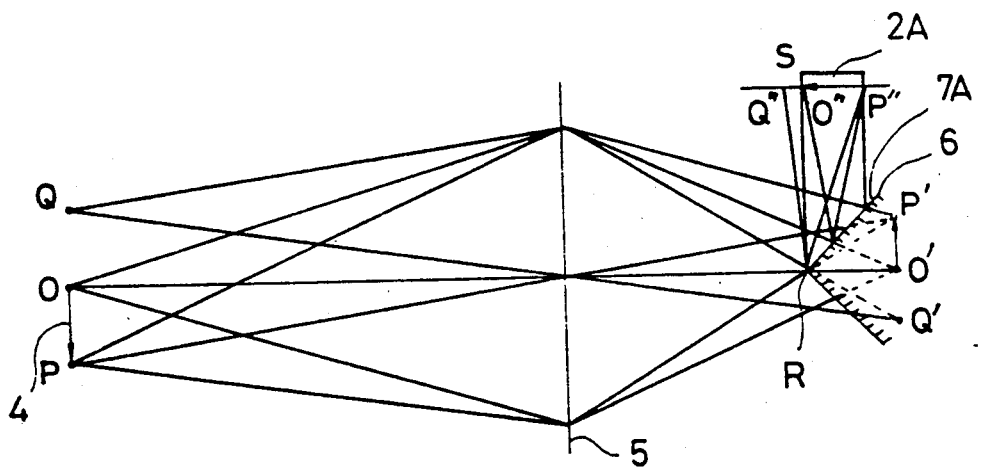
FIG. 5 shows an optical systematic configuration explaining the reflection at the prismatic mirror.
Figure 10:
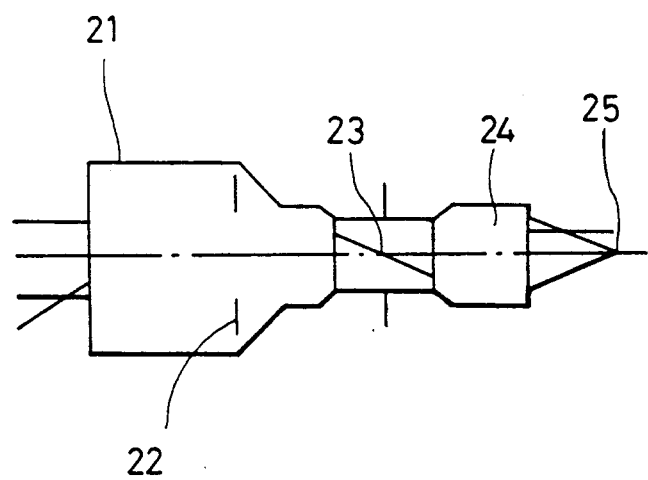
FIGS. 10 to 13 show an optical systematic configurations of a fourth embodiment according to the present invention.
Figure 11:
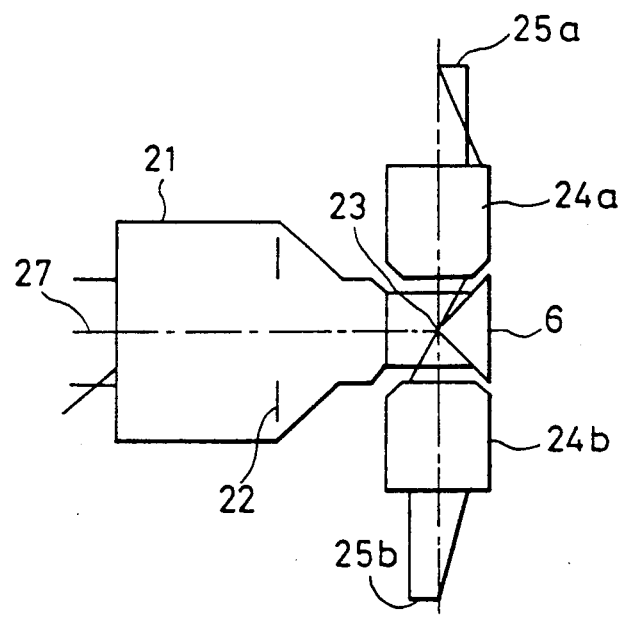
Figure 12:
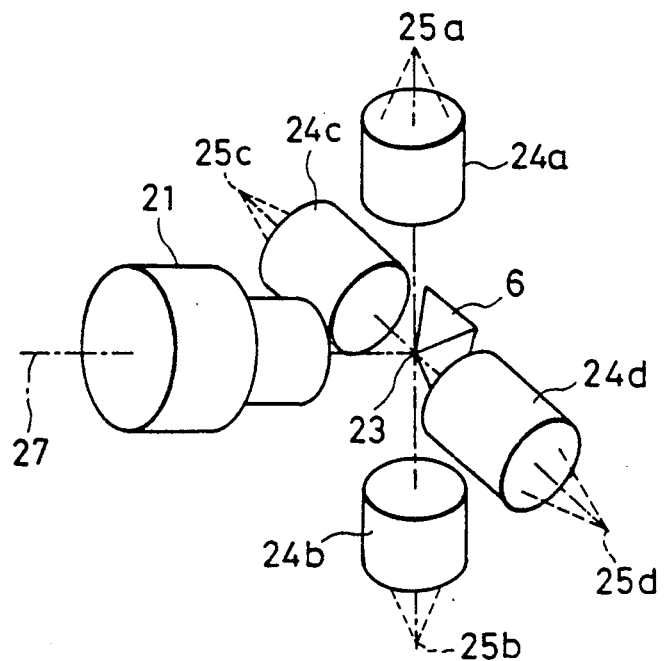
Figure 13:
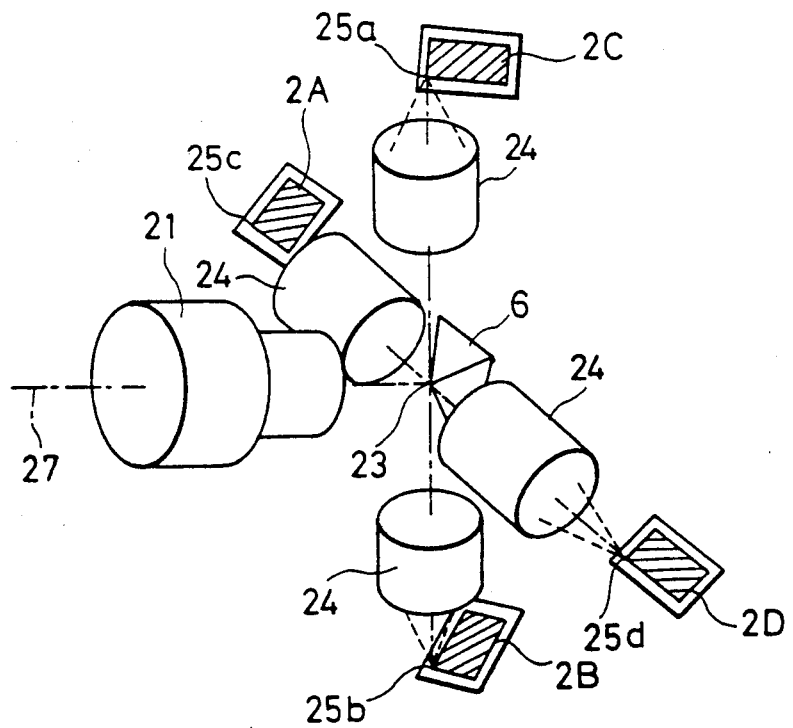

By the way, with reference to FIG. 5, the luminous intensity of the point P" is four times as strong as that of the point O", which causes the shading. Because a part of the optical image from the point 0 is quartered, whereas that from the point P is concentrated on the point P". Accordingly, the present invention provides another image forming apparatus in which a reflector, which corresponds to the prismatic mirror 6, is located at a pupil point where an entrance pupil or an exit pupil is formed. A description will now be given of an image forming apparatus in which the reflector is located at the pupil point with reference to FIG. 10 to FIG. 12. Unlike the optical systematic configurations in FIGS. 11 and 12, FIG. 10 does not indicate any reflectors. The optical systematic configuration includes first and second lens groups 21 and 24, an iris 22, and a pupil point 23. The solid-state image sensor is located at a point 25. The first lens group 21 includes a limiting aperture 22 so that the optical image is formed at the pupil point 23. Incidentally, the limiting aperture 22 may be located in the second lens group 24. FIG. 11 and FIG. 12 show optical systematic configurations in which the prismatic mirror 6 is located at the pupil point shown in FIG. 10. The number 27 indicates the optical axis of this optical system. Since most of the characteristics of the optical systematic configurations shown in FIG. 4 to FIG. 6 are disclosed by the reference No. 60-213178, a detailed description thereof will be omitted. The difference between the present invention and the reference No. 60-213178 is the division of the optical image and the composition of the image parts corresponding to the optical image parts, as mentioned above. FIG. 13 shows an image forming apparatus in which the solid-state image sensors 2A to 2D are located to the points 25A to 25D, respectively, which points 25A to 25D are shown in FIG. 12. The prismatic mirror 6 has a quadrangular pyramid shape whose top is located at the pupil position 23, and whose bottom surface is vertical to the optical axis 27. Each of the reflecting surfaces inclines at a 45° in relation to the bottom surface so that an optical image from the lens group 21 is quartered so as to be reflected in the vertical direction in relation to the optical axis 27. Consequently, the image formation is performed on each solid-state image sensor via the second lens group 14a to 14d. Oblique line parts of the solid-state image sensors indicate the scannable parts thereof. The image forming apparatus of this embodiment can be applicable to the case shown in FIG. 9, needless to say.

Thus, it is preferable to provide the reflector with two or four reflecting surfaces so that the reflected optical image parts have rectangular shapes, and the solid-state image sensors can easily receive them. In addition, the solid-state image sensors may be located vertical to the reflected optical line, which is convenient to arrange.

Figure 14:
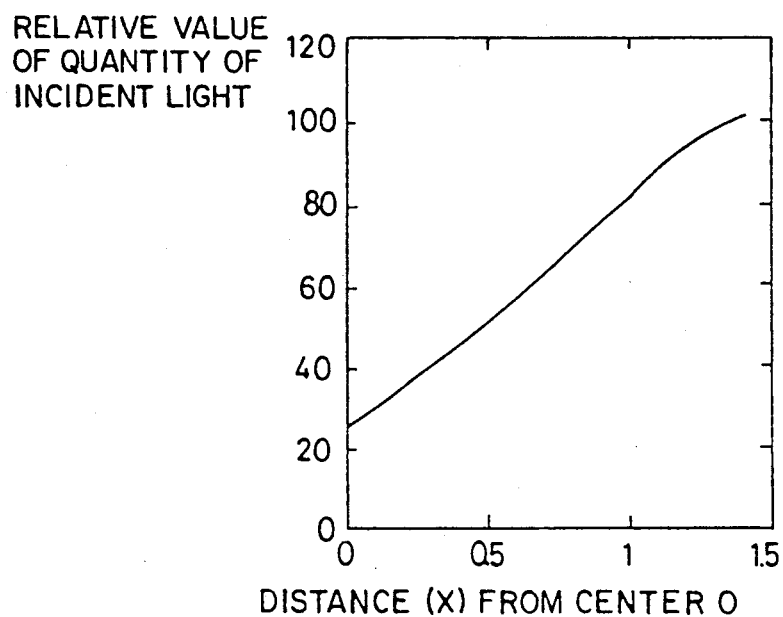
FIGS. 14(a) and 14(b) show the quantity of light distribution on the solid-state image sensor.
Figure 14:
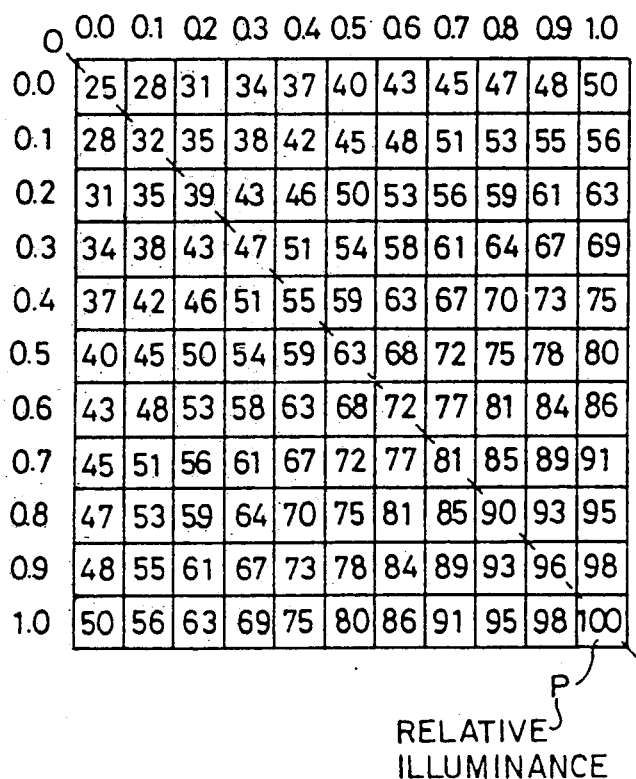
Figure 15:
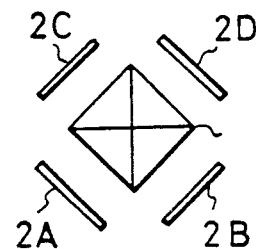
FIG. 15 shows an optical image configuration viewed from a subject.
Figure 16:
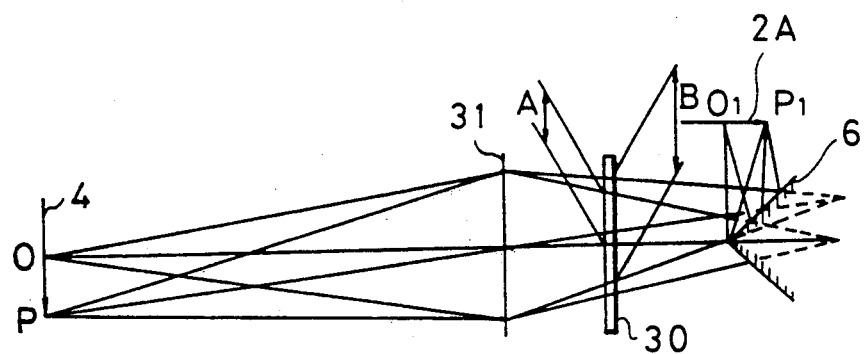
FIGS. 16(a) and 16(b) shows optical systematic configurations of an image forming apparatus of a fifth embodiment according to the present invention.
Figure 16:
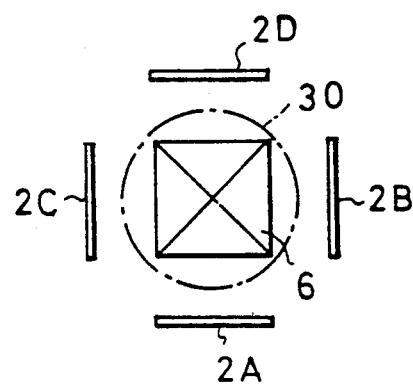
Figure 17:
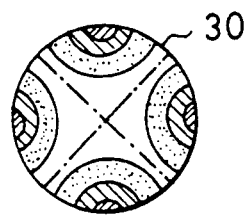
FIG. 17 shows a quantity-of-light distribution adjusting filter.

A description will be given of an image forming apparatus of the fifth embodiment according to the present invention. As mentioned above, with reference to FIG. 5, the luminous intensity of the point P" is four times as strong as that of the point O", which causes the shading. FIGS. 14(a) shows the relationship between the quantity of the incident light and a distance by means of the absolute value of the image surface illuminance. In FIG. 14(a), a transversal axis indicates a distance (X) from the center O, and a vertical axis indicates the quantity of the incident light. FIG. 14(b) shows a relative illuminance on the solid-state image sensor. Moreover, the quantity of light is halved at a ridgeline of two adjacent reflecting surfaces. The transverse axis, that is, the distance (X), shown in FIG. 14(a) corresponds to an oblique line X shown in FIG. 14(b), by multiplying the values of the transverse axis shown in FIG. 14(b) by $\sqrt{2}$. For example, the center point O is reflected at the four reflecting surfaces. FIG. 15 shows the optical image configuration viewed from the subject 4. Each of the solid-state image sensors has the maximum exposure quantity so that a predetermined signal-to-noise ratio of the photoelectric conversion output is cannot be obtained even if the illuminance of the subject 4 is simply strengthened. Therefore, the quantity of incident light to the solid-state image sensor is to be uniform. Accordingly, the present invention also provide an image forming apparatus which prevents from the shading by using a quantity-of-light distribution adjusting filter. FIGS. 16(a) and (b) show optical systematic configurations of the image forming apparatus of the fifth embodiment. FIG. 16(a) shows an optical systematic configuration, FIG. 16(b) shows an optical systematic configuration viewed from the subject 4 shown in FIG. 16(a). A quantity-of-light distribution adjusting filter 30 is located between a taking lens 31 and a quadrangular pyramid prismatic mirror 6 so as to lower the transmittance of the optical image. The taking lens 31 includes a limiting aperture. The center of the quantity-of-light distribution adjusting filter 30, which is shown in FIG. 17, is aligned with the optical axis of the optical system of the embodiment. The quantity-of-light distribution adjusting filter 30 directs to the quadrangular pyramid prismatic mirror 6 so that the quantity of incident light from the edge, the vicinity of the point P, of the subject 4 is made lower than that from the center, the vicinity of the point O thereof. Thus, the distribution of the quantity of the incident light to the solid-state image sensors is made uniform.

Figure 18:
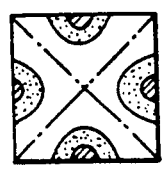
FIG. 18 shows another example of the quadrangular pyramid prismatic mirror according to the present invention.

FIG. 18 shows another example of the quadrangular pyramid prismatic mirror according to the present invention. In the prismatic mirror, the reflectance of each of the reflecting surfaces is made gradually higher from a bottom surface to the top thereof.

FIG. 19 shows another quantity-of-light distribution adjusting filter located between the prismatic mirror and the solid-state image sensor. The quantity-of-light distribution adjusting filter uniformizes the quantity of light distribution from the quadrangular pyramid prismatic. Hereupon, since the solid-state image sensor usually has a low pass filter or an infrared cutting filter in the front thereof, the transmittance distribution process may be performed to the low pass filter or the infrared cutting filter by means of deposition, and the like. Thus, the shading problem can be eliminated without adding any elements.

Further, the present invention is not limited to these preferred embodiments, but various variations and modifications may be made without departing from the scope of the present invention.

What is claimed is:

1. An image forming apparatus for forming an image corresponding to a subject, comprising:
   a) a taking lens for making an optical image corresponding to the subject;
   b) dividing means for dividing the optical image transmitted via said taking lens into a plurality of adjacent optical image parts;
   c) a plurality of solid-state image sensors corresponding to the number of the optical image parts, each of said solid-state image sensors receiving a corresponding optical image part from among the plurality of optical image parts from said dividing means and outputting an image signal corresponding to the optical image part, the optical image parts received by said solid-state image sensors being adjacent to each other; and
   d) image forming means, coupled to said solid-state image sensors, for forming an image part corresponding to the respective optical image part based on the image signal transmitted from one of said solid-state image sensors, and for composing each image part to form the image corresponding to the subject by arranging the image parts to be adjacent to each other like the optical image parts;
   wherein:
   said dividing means includes a reflector having a plurality of reflecting surfaces for reflecting the optical image transmitted via said taking lens while dividing the optical image into a plurality of adjacent optical image parts corresponding to the number of the reflecting surfaces;
   said image forming apparatus uses an optical system having an optical axis;
   said subject and said taking lens are aligned with the optical axis;
   said reflector has a top which is aligned with the optical axis;
   said reflector has a bottom surface vertical to the optical axis and opposite to the top thereof; and
   the reflectance of each of the reflecting surfaces of said reflector is gradually higher from the bottom surface of the reflector to the top thereof.

2. The image forming apparatus of claim 1, wherein said reflector has four reflecting surfaces.

3. The image forming apparatus of claim 1, wherein said reflector has a quadrangular pyramid shape.

4. The image forming apparatus of claim 1, wherein:
   said reflector has a trigonal prismatic shape with two reflecting surfaces, each of the optical image parts has an approximately rectangular shape, and a center of the optical image is reflected at the top of the reflector, so that each optical image part includes the center of the optical image; and
   each of said solid-state image sensors has a rectangular receiving surface for receiving the corresponding optical image part, and one of four corners of the rectangular receiving surface receives the optical image part corresponding to the center of the optical image.

5. The image forming apparatus of claim 1, wherein:
   said reflector has a trigonal prismatic shape with two reflecting surfaces; and
   each of the optical image parts has an approximately rectangular shape.

6. The image forming apparatus of claim 1, wherein said taking lens makes the optical image at a pupil point, the top of said reflector being located at the pupil point.

7. An image forming apparatus for forming an image corresponding to a subject, comprising:
   a) a taking lens for making an optical image corresponding to the subject;
   b) dividing means for dividing the optical image transmitted via said taking lens into a plurality of adjacent optical image parts;
   c) a plurality of solid-state image sensors corresponding to the number of the optical image parts, each of said solid-state image sensors receiving a corresponding optical image part from among the plurality of optical image parts from said dividing means and outputting an image signal corresponding to the optical image part, the optical image parts received by said solid-state image sensors being adjacent to each other;
   d) image forming means, coupled to said solid-state image sensors, for forming an image part corresponding to the respective optical image part based on the image signal transmitted from one of said solid-state image sensors, and for composing each image part to form the image corresponding to the subject by arranging the image parts to be adjacent to each other like the optical image parts; and
   e) quantity-of-light distribution adjusting means for adjusting the quantity of light so that the distribution of the quantity of light is uniform, said quantity-of-light distribution adjusting means being located between said taking lens and said solid-state image sensors.

8. The image forming apparatus of claim 7, wherein:
   said quantity-of-light distribution adjusting means includes a low pass filter on which a transmittance distribution process is performed.

9. The image forming apparatus of claim 7, wherein:
   said quantity-of-light distribution adjusting means includes an infrared cutting filter on which transmittance distribution process is performed.

10. An image forming apparatus for forming an image corresponding to a subject, comprising:
    a) a taking lens for making an optical image corresponding to the subject;
    b) dividing means for dividing the optical image transmitted via said taking lens into a plurality of adjacent optical image parts;
    c) a plurality of solid-state image sensors corresponding to the number of the optical image parts, each of said solid-state image sensors receiving a corresponding optical image part from among the plurality of optical image parts from said dividing means and outputting an image signal corresponding to the optical image part, the optical image parts received by said solid-state image sensors being generally adjacent to, but partially overlapping each other;
    d) image forming means, coupled to said solid-state image sensors, for forming an image part corresponding to the respective optical image part based on the image signal transmitted from one of said solid-state image sensors, and for composing each image part to form the image corresponding to the subject; and e) image abandoning means, coupled to said image forming means, for eliminating an overlapping part between the optical image parts when said image forming means composes each image part so that a duplicate image part cannot be composed;

wherein:

said dividing means includes a reflector having a plurality of reflecting surfaces for reflecting the optical image transmitted via said taking lens while dividing the optical image into a plurality of adjacent optical image parts corresponding to the number of the reflecting surfaces;

said image forming apparatus uses an optical system having an optical axis;

the subject and said taking lens are aligned with the optical axis;

said reflector has a top which is aligned with the optical axis;

said reflector has a bottom surface vertical to the optical axis and opposite to the top thereof; and the reflectance of each of the reflecting surfaces of said reflector is gradually higher from the bottom surface of the reflector to the top thereof.

11. The image forming apparatus of claim 10, wherein said reflector has four reflecting surfaces.

12. The image forming apparatus of claim 10, wherein said reflector has a quadrangular pyramid shape.

13. The image forming apparatus of claim 10, wherein:

said reflector has a trigonal prismatic shape with two reflecting surfaces; and each of the optical image parts has an approximately rectangular shape.

14. The image forming apparatus of claim 10, wherein said taking lens making the optical image at a pupil point, the top of said reflector being located at the pupil point.

15. An image forming apparatus for forming an image corresponding to a subject, comprising:

a) a taking lens for making an optical image corresponding to the subject;

b) dividing means for dividing the optical image transmitted via said taking lens into a plurality of adjacent optical image parts;

c) a plurality of solid-state image sensors corresponding to the number of the optical image parts, each of said solid-state image sensors receiving a corresponding optical image part from among the plurality of optical image parts from said dividing means and outputting an image signal corresponding to the optical image part, the optical image parts received by said solid-state image sensors being generally adjacent to, but partially overlapping each other;

d) image forming means, coupled to said solid-state image sensors, for forming an image part corresponding to the respective optical image part based on the image signal transmitted from one of said solid-state image sensors, and for composing each image part to form the image corresponding to the subject;

e) image abandoning means, coupled to said image forming means, for eliminating an overlapping part between the optical image parts when said image forming means composes each image part so that a duplicate image part cannot be composed; and f) quantity-of-light distribution adjusting means for adjusting the quantity of light so that the distribution of the quantity of light is uniform, said quantity-of-light distribution adjusting means being located between said taking lens and said solid-state image sensors.

16. The image forming apparatus of claim 15, wherein:

said quantity-of-light distribution adjusting means includes a low pass filter on which a transmittance distribution process is performed.

17. The image forming apparatus of claim 15, wherein:

said quantity-of-light distribution adjusting means includes an infrared cutting filter on which a transmittance distribution process is performed.

* * * * *